US012623151B2

(12) United States Patent
Breugelmans

(10) Patent No.: US 12,623,151 B2
(45) Date of Patent: May 12, 2026

(54) USER ACCESSIBILITY SYSTEM AND METHOD

(71) Applicant: Sony Interactive Entertainment Inc., Tokyo (JP)

(72) Inventor: Mark Jacobus Breugelmans, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 278 days.

(21) Appl. No.: 18/451,348

(22) Filed: Aug. 17, 2023

(65) Prior Publication Data

US 2024/0075389 A1 Mar. 7, 2024

(30) Foreign Application Priority Data

Sep. 1, 2022 (GB) ...................................... 2212725

(51) Int. Cl.
*A63F 13/60* (2014.01)
*A63F 13/79* (2014.01)
(52) U.S. Cl.
CPC .............. *A63F 13/60* (2014.09); *A63F 13/79* (2014.09)
(58) Field of Classification Search
None
See application file for complete search history.

(56) References Cited

U.S. PATENT DOCUMENTS

| | | | |
|---|---|---|---|
| 2012/0197874 A1 | 8/2012 | Zatkin | |
| 2013/0288777 A1* | 10/2013 | Short | A63F 13/212 463/23 |
| 2020/0171389 A1 | 6/2020 | Eatedali | |
| 2021/0113916 A1 | 4/2021 | Bedwell | |
| 2021/0129032 A1* | 5/2021 | Elenbaas | A63F 13/212 |
| 2021/0322888 A1* | 10/2021 | Arroyo Palacios | A63F 13/69 |

FOREIGN PATENT DOCUMENTS

JP 2021108742 A 8/2021

OTHER PUBLICATIONS

Combined Search and Examination Report for corresponding GB Application No. 2212725.2, 5 pages, dated Feb. 27, 2023.
Extended European Search Report in European Appln. No. 23192995. 1, mailed on Jan. 26, 2024, 12 pages.
Gay, "Teaching accessibility awareness with games," The 5th International Conference on Future Networks & Distributed Systems, Apr. 19, 2021, 3 pages.
Stiegler et al., "Gamification and accessibility," International Conference on Human Aspects of IT for the Aged Population, Jul. 21, 2015, 10 pages.

* cited by examiner

*Primary Examiner* — Jason T Yen
(74) *Attorney, Agent, or Firm* — Fish & Richardson P.C.

(57) ABSTRACT

A user accessibility method for a videogame system includes obtaining trophy records for a plurality of games played by the user, generating an accessibility profile responsive to accessibility issues indicated by at least some of the trophy records, and modifying one or more operational parameters of the videogame system in response to the generated accessibility profile.

16 Claims, 3 Drawing Sheets

Obtain trophy records for a plurality of games played by the user — s310

Generate an accessibility profile responsive to accessibility issues indicated by at least some of the trophy records — s320

Modify one or more operational parameters of the videogame system in response to the generated accessibility profile — s330

USER ACCESSIBILITY SYSTEM AND METHOD

BACKGROUND OF THE INVENTION

Field of the Invention

The present invention relates to a user accessibility system and method for a videogame platform.

Description of the Prior Art

Modern videogames can be complex and place considerable demands on a player of such a game. Typically this provides the player with immersion as they fully focus on the game and are absorbed into it. However for some players, aspects of such a game may be difficult to overcome due to any one or more of a range of sensory, cognitive, or motor issues that may impair their enjoyment of the game or, more critically, their ability to access the game or progress within it.

Whilst a game could be adapted to be able to mitigate or alleviate at least some such issues for a player, it is will be necessary to identify what issues to address in this way within the game.

The present invention seeks to mitigate or alleviate this problem.

SUMMARY OF THE INVENTION

Various aspects and features of the present invention are defined in the appended claims and within the text of the accompanying description.

In a first aspect, a user accessibility method for a videogame system is provided in accordance with claim 1.

In another aspect, a user accessible videogame system is provided in accordance with claim 15.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

A user accessibility system and method are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

Figure 1:
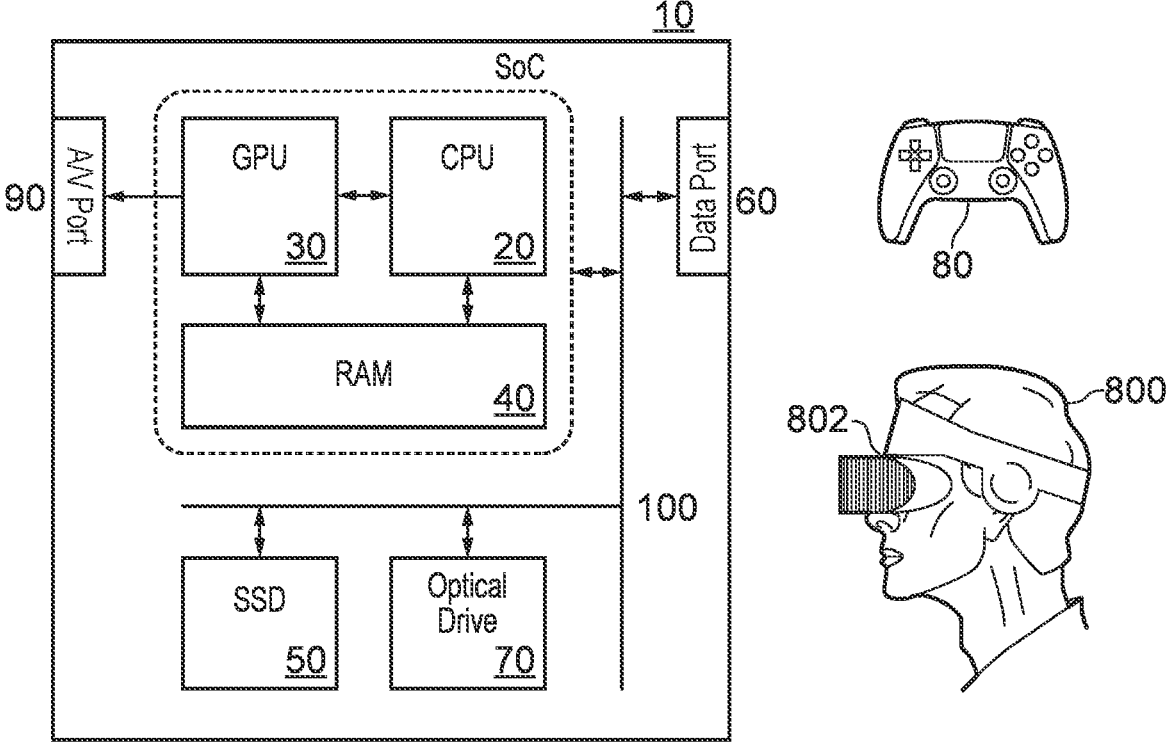
FIG. 1 is a schematic diagram of a user accessible videogame system in accordance with embodiments of the present disclosure.

Referring now to the drawings, wherein like reference numerals designate identical or corresponding parts throughout the several views, FIG. 1 shows an example of an entertainment system 10, being a computer or console such as the Sony® PlayStation 5 ® (PS5).

The entertainment system 10 comprises a central processor 20. This may be a single or multi core processor, for example comprising eight cores as in the PS5. The entertainment system also comprises a graphical processing unit or GPU 30. The GPU can be physically separate to the CPU, or integrated with the CPU as a system on a chip (SoC) as in the PS5.

The entertainment device also comprises RAM 40, and may either have separate RAM for each of the CPU and GPU, or shared RAM as in the PS5. The or each RAM can be physically separate, or integrated as part of an SoC as in the PS5. Further storage is provided by a disk 50, either as an external or internal hard drive, or as an external solid state drive, or an internal solid state drive as in the PS5.

The entertainment device may transmit or receive data via one or more data ports 60, such as a USB port, Ethernet® port, WiFi® port, Bluetooth® port or similar, as appropriate. It may also optionally receive data via an optical drive 70.

Interaction with the system is typically provided using one or more handheld controllers 80, such as the DualSense® controller in the case of the PS5.

Audio/visual outputs from the entertainment device are typically provided through one or more A/V ports 90, or through one or more of the wired or wireless data ports 60.

Where components are not integrated, they may be connected as appropriate either by a dedicated data link or via a bus 100.

An example of a device for displaying images output by the entertainment system is a head mounted display 'HMD' 802, worn by a user 800.

In embodiments of the present description, such an entertainment system is configured to operate as a user characterisation system. Alternatively or in addition the functionality of such a user characterisation system may be performed by a remote central server (not shown), or shared between the entertainment system and server, as applicable.

It is desirable to characterise an accessibility profile for a user; that is to say, identify games or parts of games that either may be particularly well suited to the abilities of the user, or where limits or differences in the abilities of a user may make a game or part of a game difficult for the user to complete, or at least unenjoyable.

Hence for example a game or level that presents an overwhelming amount of visual and/or auditory information may be unsuitable or unenjoyable for a player on the autistic spectrum and/or who has sensory processing difficulties, whilst a game or level that requires fast, precise, and/or intricate motor control may be unsuitable or unenjoyable for a player with arthritis and/or motor control difficulties.

In principle, a user could list issues that they know or believe they have as part of a profile associated with a user ID, but this may either be over prescriptive if a user feels they need to be exhaustive in the listing, or difficult for a user to calibrate with respect to as yet un-played games; and indeed it is likely that a particular source of frustration for a user may come from issues that they do not realise or fully realise they have.

Accordingly, embodiments of the present description seek to characterise accessibility profile for the user automatically based upon their play of a plurality of games over time. Such a profile can identify a user's accessibility issues (and/or proficiencies) in one or more classes of accessibility including sensory, motor, and cognitive issues, as discussed elsewhere.

It will be appreciated that it would be prohibitively complex for an automatic system to accurately interpret the salience of user capabilities for any given game, for example to determine if a user has difficulty solving word-based puzzles as opposed to spatial puzzles, or has difficulty with hand-eye coordination, or tends to die more often when there is a large amount of flashing imagery, and the like.

However, embodiments of the present description appreciate that, albeit in an ad-hoc fashion, this complex problem is solved in most games through a trophy or achievement system.

A trophy or achievement system (hereafter just referred to as a trophy system) identifies particular activities, behaviours, achievements, and events within a particular game that may be considered noteworthy, and issues or unlocks a notional trophy when each one occurs or more generally the user's in-game activity meets the criterion set for a given trophy.

Whilst these trophies might be viewed in game, notably they are also made available to an external digital distribution platform, such as that found in the PlayStation® operating system. A similar scheme can be found in other digital attribution platforms such as Steam® and Origin®.

Typically the platform summarises the user's unlocked trophies on a game's launch page, and may notify the user's friends when new trophies are unlocked. Moreover, the platform can track the number of trophies unlocked across a plurality of games and optionally the comparative rarity of such trophies/notional trophy value (for example indicative of how difficult the developer of a game considers it to be to unlock the trophy, or indicative of what percentage of players actually unlock that trophy), to generate a notional trophy score across all games played, for example over all time, or over the last year, month, week, etc.

Figure 2A:
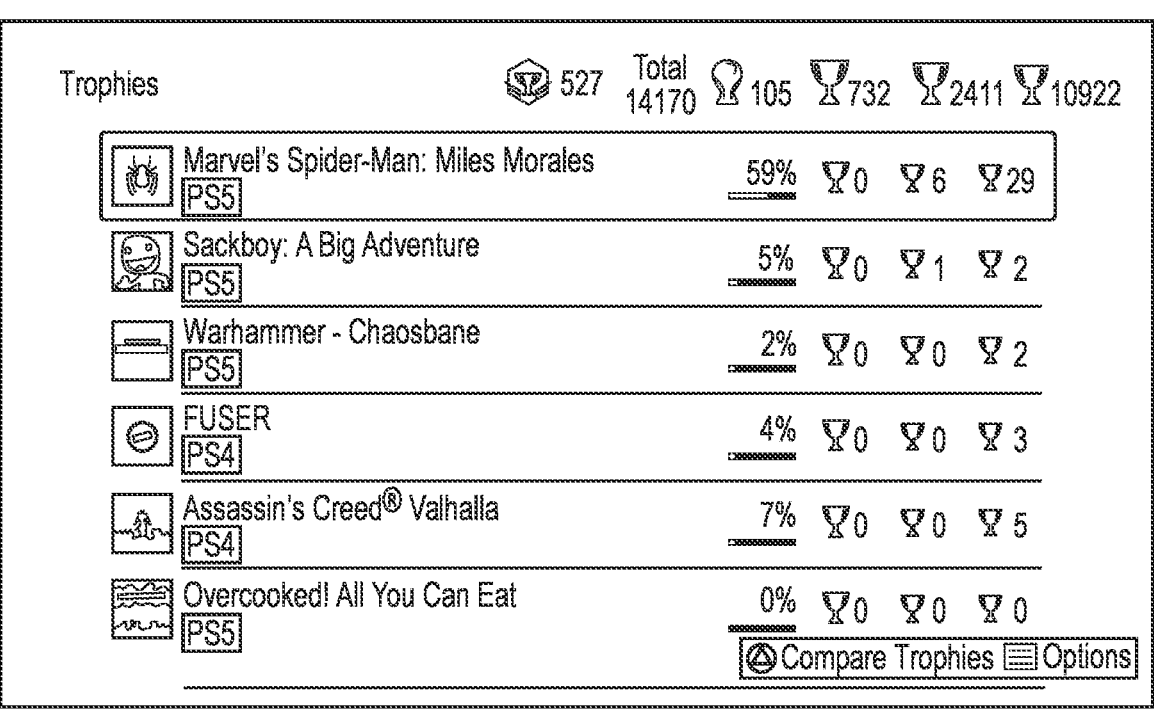
FIGS. 2A and 2B are schematic diagrams illustrating a trophy system of a user accessible videogame system in accordance with embodiments of the present disclosure.

FIG. 2A illustrates such a trophy screen, with (in this case) gold, silver and bronze trophies for individual games based on difficulty and/or rarity, and an aggregation of these trophies at the top (totaling 14170 in this case), together with a trophy 'score' (in this case a score of 527) which may be thought of for example as a ranking; for example here being at position 527 within a 1000-step distribution of total trophies scored among all players (or players in a specific region, etc.).

Figure 2B:
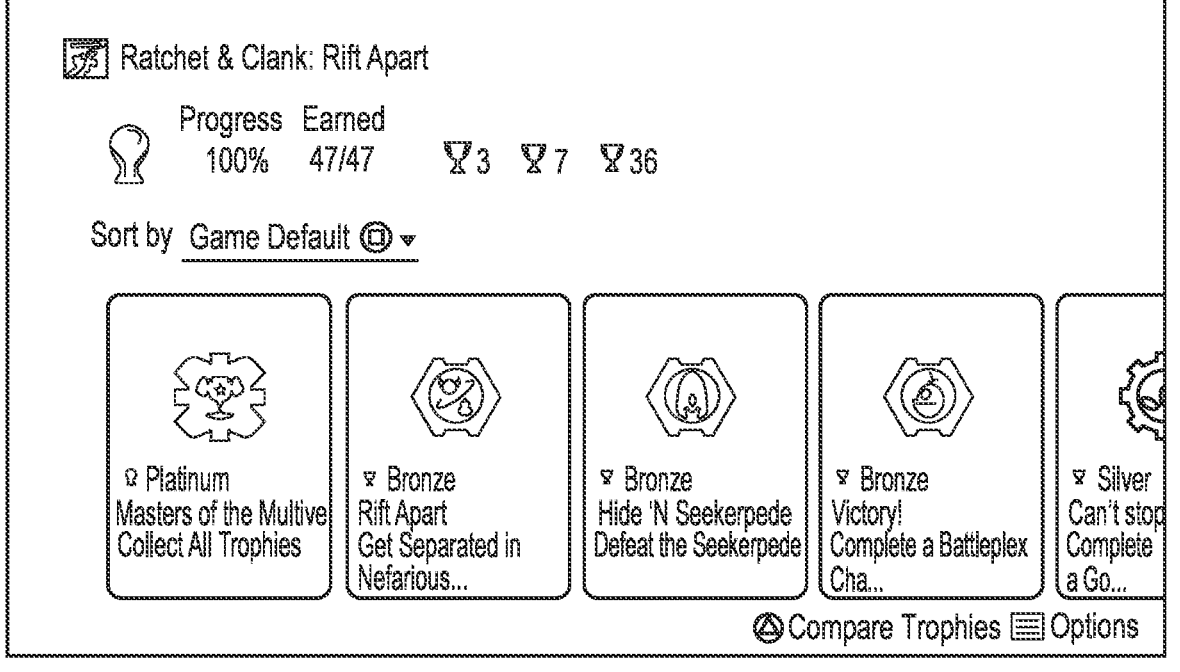

Each trophy has further information related to it, as seen for example in FIG. 2B.

Consequently, as a user plays games and accumulates trophies, they are building a characteristic pattern of trophies that reflect what they can do well and what they enjoy playing within a wide range of games.

However, it will be appreciated that these trophies are intended to reflect game achievements and encourage competitiveness and full experience of games, rather than characterise the accessibility requirements of a user per se, and so some further processing is required.

That said, optionally, one such game may be a game specifically designed to test a range of accessibility issues and optionally proficiencies, and to award trophies designed to be indicative of a range of accessibility issues and optionally proficiencies; such a game may be provided bundled with the videogame system, or free to download.

In any event, firstly, the trophies may be classified to identify what they may indicate about a user (with regards to accessibility issues and optionally proficiencies) and optionally to what degree or extent they make that indication.

Hence winning a trophy that relates to an action that requires persistent fine motor control (e.g. scoring 100 bulls-eyes in a single session) may indicate that the user is proficient with this capability. Meanwhile not winning a marksmanship trophy that a large percentage of the game playing population has won may indicate a difficulty either with motor control or equivalently hand-eye-coordination.

A master list of accessibility issues may be compiled, and winning a trophy may be classified as indicating that a user either does or does not have a particular accessibility issue (or issues) depending on the nature of the trophy. Similarly, optionally not winning a trophy may (optionally depending on criteria described elsewhere herein) be classified as indicating that a user either does or does not have a particular issue (or issues) depending on the nature of the trophy.

The above classification may be performed manually with reference to the master list, for example by the platform provider, for the top N installed games in the user-base for whom the techniques herein are to be applied. Here N may be 10, 50, 100, 200 or more. When new games are released that are anticipated to be popular these can also be added, or the platform provider can request that this classification is performed by game developers.

Using the above approach, it can be reasonably assumed that most users will have multiple games installed and played (or to be played) that have such classified trophies. This will enable a suitable characterisation of the user's accessibility issues. This characterisation can become more complete/nuanced, or evolve over time, as new games with classified trophies are played. The classifications themselves can be downloaded for a game's trophy set if not already present on the user's system. Alternatively, the accessibility profile can be compiled at a central server that receives notifications of the user's trophy records.

In the event that the user has no such installed games, or fewer than M games (or fewer than P classified trophies) then optionally the techniques described herein may be suspended until a sufficient sample of trophies is available. In this case, M and P may be chosen empirically, for example based on statistical significance, user feedback, and assessment of the accessibility issue estimates of the system.

In principle, once the N games' trophies have been classified, then optionally trophies of other games may be automatically classified based on similar wording in their descriptions, or other correlates in metadata associated with the trophies, in order to increase the reach of the technique to other games. In this case, the contribution of the trophy classifications to an accessibility issue assessment may be weighted less, or assessments drawn from these trophies may be accompanied by a caveat informing the user that they may be less accurate.

Once trophies have been manually or automatically classified for their relevance to one or more accessibility issues, whether in relation to winning and/or not winning the trophy, in dependence upon the nature of the trophy, then winning or not winning such trophies can be used to assess the player's accessibility issues In this regard, the salience of a trophy's status (won and/or not won, as applicable) may optionally be assessed according to several criteria.

For example, there will be some trophies that require no real proficiency to achieve, such as 'Walking out of the front door' to start a game. Winning such trophies is unlikely to be indicative of a proficiency of the user, and they may be either weighted to have a zero or near zero contribution, or may be classified as 'neutral' or similar.

Similarly there will be some trophies that only a very small proportion of elite gamers will win—consequently not winning such a trophy is also unlikely to be indicative of an accessibility issue (or more precisely, an accessibility issue not shared with a majority of the gaming populace).

Conversely, failing to win a very common or near mandatory trophy may be indicative of a significant accessibility issue, whilst winning a very rare or difficult trophy may be indicative of a particular accessibility proficiency.

Outside of these extremes, other trophies will be relatively common or relatively rare, and the winning or otherwise of these trophies can be assigned a weighting or salience related to the significance of winning or not winning the trophy relative to the gaming population at large.

To a first approximation, the salience for a given trophy is the opposite of the user's own trophy state; that is to say, if a large proportion of players win the trophy, and the current user has not, then this is salient. Meanwhile if a large proportion of players have not one the trophy and the current user does, then this is also salient. Conversely if a large proportion of players win the trophy and so does the user, then this may not be salient (for example, indicating that required proficiency is average or minimal). Similarly if a large proportion of players do not win the trophy and neither does the user, then this may not be salient. In other words, the salience for a given trophy may depend upon whether the user's achievement or lack thereof goes against the grain of (the expectation for) the gaming population at large.

This assessment may be subject to further caveats relating to when within a game the trophy can be won, and hence may be assessed relative to developer expectations and/or (if these expectations are not available) mean trophy winning rates for different types and/or levels of trophy, either within the particular game or across multiple games (e.g. of similar genres, though not necessarily).

For example there will be trophies that a large majority of users achieve (for example 90%), either because they are early on in the game, or are part of a main quest. Consequently winning these trophies is unlikely to be salient. Meanwhile similarly there will be trophies that only a relatively small number of users achieve (for example 20%). In some cases, winning these trophies may be salient either because they indicate a relative proficiency, or a particular choice of in-game activity. In other cases, winning these trophies may not be salient because whilst only 20% of all players in total win the trophy, nearly all players who play the particular associated quest win the trophy.

Hence as noted above the context in which the trophy may be won can be relevant to what it signifies and the salience of winning or not winning it. Again, the significance of these conditions can be incorporated into a manual review and mark-up of the trophies in a particular game.

Hence to a second approximation, the salience of a given trophy may depend on whether the user's achievement or lack thereof goes against the expectations for the subset of the gaming population who might reasonably be expected to encounter the conditions in which the trophy may be won.

It will be appreciated that a given trophy may signify more than one salient aspect of user accessibility; for example winning a trophy may indicate both and obsessive behaviour pattern (for example whether trophy comprises collecting all objects of a certain type) and also proficiency in a particular skill (for example where collecting these objects requires particular attention to detail, puzzle solving, or motor skills).

Meanwhile, as an accessibility profile for the user is built up the salience of the given trophy may also be evaluated against the accessibility profile built to date; hence for example if a user consistently indicates an obsessive behaviour pattern and a tendency to be completist in the collection of objects or exploration of locations, then failing to win a trophy indicative of this behaviour may more strongly signify an accessibility issue relating to the other abilities required to win the trophy, such as attention to detail, puzzle solving, and/or motor skills.

Hence to third approximation, the salience of a given trophy may also depend upon the expectations of the user as indicated by their existing accessibility profile. To facilitate this approach, optionally their accessibility profile may be initially built without using this approach for only a partial record of their trophy history, and then built in one or two iterations using this approach for remaining tranches of their trophy history. Subsequently their accessibility profile can be updated as new trophies are earned during current play (for example on a daily, weekly, or monthly schedule).

It will be appreciated that this third approximation can be combined with the second or first approximation as appropriate.

As noted above, some trophies are not achieved not because the user failed to meet the criterion, but because the relevant criterion was never encountered; this may be because of a deliberate choice of the user not to select a particular quest, or because the trophy is limited to a particular mode of play that the user has not chosen (for example multiplayer or local co-op play), or because the user has stopped playing the game and so has not reached the part of the game where the trophy occurs or could be won.

In this latter case, it may be beneficial to determine whether the user has stopped playing the game due to an accessibility issue. Optionally this may be determined by reminding the user that the game is available, and if the user declined to play, requesting that they provide feedback as to why. However alternatively or in addition (for example if the user does not provide feedback), it may be useful to evaluate trophies that could be won or are near completion for the degree of in game progress indicated by the last save game of the user. Typically games indicate progress in this way, and so this may be analysed to indicate whether the user may have encountered frustration or barriers to play with a particular game element, such as for example failing to beat a boss (for which there was an associated trophy), or not completing a race within a threshold time limit, and the like.

Hence optionally to fourth approximation, the salience of the trophy may increase based on its proximity to the game progress of the last game save or how close it is to meeting a success criteria at the game progress of the last game save, when a game has not been played for a predetermined period of time (for example two or four weeks), and/or when the user has indicated a dissatisfaction with the game or an intention to no longer play, whether explicit via feedback or implicit via uninstalling the game.

Again this fourth approximation can be combined with any of the other approximations as appropriate.

In any event, the above evaluation results in classifications of accessibility issues or proficiencies as indicated by corresponding classify trophies, optionally weighted by one considerations of salience, as outlined in the $1^{st}$ to $4^{th}$ approximations listed above.

As a non-limiting example, these optionally weighted classifications may contribute to a histogram count for a variety of predetermined accessibility issues or proficiencies to indicate where a user may have more particular problems or particular flair.

This histogram may then act as the users accessibility profile, or may be further processed to characterise the user, for example as one of a plurality of predetermined user types for which mitigating actions may be provided.

This may be achieved by comparing some or all of the histogram against predefined templates corresponding to predetermined user types (for example user types with arthritis, or Parkinson's; user types with obsessive-compulsive disorder, or on the autism spectrum; user types with colour-blindness, or other visual impairment; user types with hearing impairment; and the like).

In response to characterising a user as belonging to one or more of these predetermined user types, information may be provided to the user about how to mitigate these issues, for example by adjusting settings or using particular peripherals.

Alternatively or in addition, the system may use an API that can indicate to games whether a user belongs to one or more of these predetermined user types, so that the game itself may modify aspects of its behaviour, including but not limited to one or more of input adjustment (for example input re-mapping, input sensitivity, input control layout, input device choice), motor control assist (for example auto aim, or repulsive crash barriers), sensory assistance (for example high contrast display, changes to audio output or mixing, increased subtitle size), cognitive assistance (for example providing additional guidance or reminders relating to a current quest or a next target), and the like.

Clearly optionally a game may alternatively or in addition directly use the raw histogram data or whatever user characterising data is held by the assistance profile to modify its behaviour.

Clearly also the game may modify its behaviour specifically so that a particular trophy is easier to win; for example awarding the trophy if 90% of objects are collected instead of 100%. In this case, optionally the trophy may be marked using meta data so that it is either discounted in future accessibility assessment, or its salience is reduced.

Similarly, if a game modifies aspects of its behaviour in response to the accessibility profile, this may be indicated using meta data so that trophies awarded by this game, or not achieved by the user for this game, may be discounted or have their salience reduced for future accessibility assessments, since they do not fully reflect the accessibility issues of the user and hence may result in the accessibility issues being underestimated when added to the trophy history.

In the above cases, salience may be thought of as a weighting, where winning or as appropriate not winning a trophy may count as '1', but a high salience acts as a multiplier increasing the count to greater than 1 and a low salience acts as a multiplier decreasing the couch to less than 1, with the multipliers being selected by the reviewers of the trophies, and/or determined empirically.

In addition to providing information to the user about how to mitigate any accessibility issues, and/or modifying a behaviour, optionally the system may provide a bespoke accessibility review of a prospective game for the user, if the user is thinking about playing the game.

This review may be based upon classifications of the trophies for the prospective game, and optionally how many users when those trophies, together with the accessibility profile of the user.

Hence for example if a game as a large number of trophies relating to dexterity or fast reflexes that are won by a relatively large percentage of those players who have the opportunity to win the trophies, and meanwhile the user's accessibility profile indicates they have motor control problems, or they have been characterised for example as having arthritis, then the system may recommend to the user that they do not play the game, or advise mitigating actions such as playing the game on the easy setting rather than normal.

Optionally, where a plurality of prospective games are available for the user to play, the system may review the games in this way so as to rank them in order of suitability for the user, optionally in conjunction with other considerations such as overall popularity of the game, relevance to the user's own expressed interests, and the like.

Figure 3:
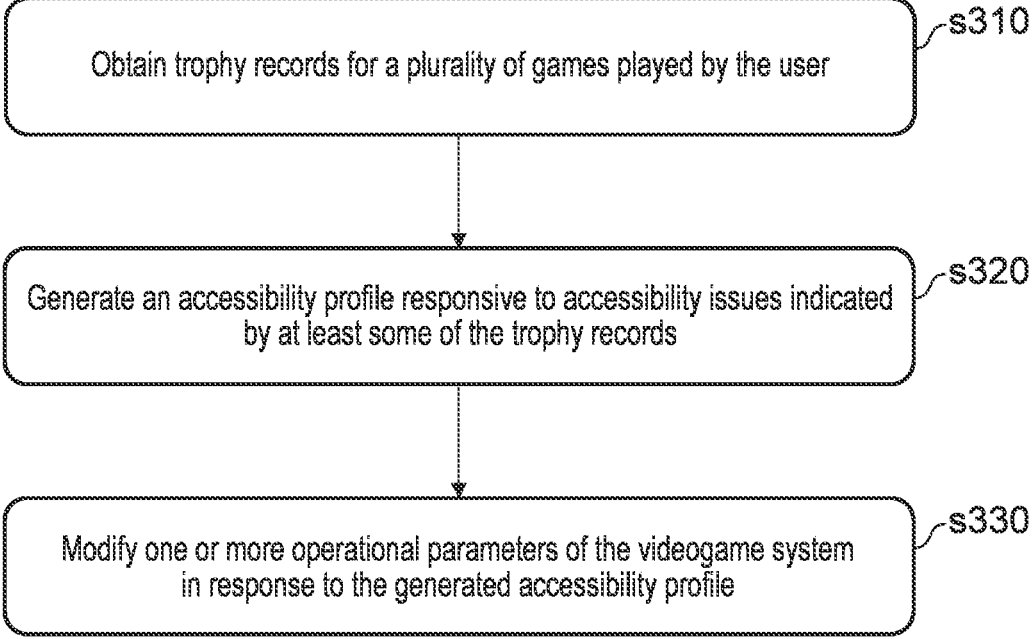
FIG. 3 is a flow diagram of a user accessibility method for a videogame system in accordance with embodiments of the present disclosure.

Turning now to FIG. 3, in a summary embodiment of the present description, a user accessibility method for a videogame system comprises the following steps.

In a first step 310, obtaining trophy records for a plurality of games played by the user, as described elsewhere herein. This may typically be done by accessing records associated with a user account, held locally to an entertainment device and/or centrally by an administrative server.

In a second step 320, generating an accessibility profile responsive to accessibility issues indicated by at least some of the trophy records, as described elsewhere herein. This is typically done based on classifications of accessibility issues indicated by winning or optionally not winning a trophy, optionally subject to one or more degrees of approximation/refinement relating to the expectations based on other players or expectations based on the history of the current user, and/or a relationship between the occurrence of the trophy and an interruption in the current user's play.

And in a third step s330, modifying one or more operational parameters of the videogame system in response to the generated accessibility profile, as described elsewhere herein. Typically this may comprise informing the user of the system's characterisation of any user accessibility issues indicated by the profile, and any mitigating actions (e.g. in terms of hardware, system or game settings, or other user actions) that may mitigate these, and/or sharing one or more aspects of the accessibility profile with other parts of the operating system and/or games, for example via an API, so that the OS and/or game can automatically adjust settings in response or offer targeted adjustments for the user to accept or refuse.

It will be apparent to a person skilled in the art that variations in the above method corresponding to operation of the various embodiments of the apparatus as described and claimed herein are considered within the scope of the present invention, including but not limited to that:

at least some trophy records are classified as indicating one or more accessibility issues of the user, as described elsewhere herein;

at least some trophy records are classified as indicating one or more proficiencies of the user, as described elsewhere herein;

an accessibility issue is indicated by a particular trophy being won, as described elsewhere herein;

an accessibility issue is indicated by a particular trophy not being won, as described elsewhere herein;

the step of generating an accessibility profile responsive to a particular trophy is responsive to whether the user's winning or not winning of the particular trophy goes against expectations of winning or not winning the particular trophy for the subset of a gaming population who encounter the conditions in which the trophy may be won, as described elsewhere herein;

the step of generating an accessibility profile responsive to a particular trophy is responsive to whether the user's winning or not winning of the particular trophy goes against expectations of winning or not winning trophies of a similar class to the particular trophy derived from a previous version of the accessibility profile of the user, as described elsewhere herein;

the step of generating an accessibility profile responsive to a particular trophy is responsive to how close within a game a success criterion for winning the trophy is to the last progress of the user in the game, as described elsewhere herein;

the accessibility profile comprises a histogram of classified accessibility issues populated responsive to at least some of the trophy records that are classified as indicating one or more accessibility issues of the user, as described elsewhere herein;

the accessibility profile comprises one or more accessibility categorisations of the user responsive to accessibility issues indicated by at least some of the trophy records, as described elsewhere herein;

at least a first part of the accessibility profile is accessible via an application programming interface, and the step of modifying one or more operational parameters of the videogame system comprises a videogame modifying one or more selected from the list consisting of an operational parameter relating to user input (for example selecting or configuring an alternative controller), an operational parameter relating to required user dexterity (for example selecting key bindings or selecting auto inputs or input assistance methods), an operational parameter relating to required user vision (for example high contrast or colour blind colour schemes, large text, etc.) an operational parameter relating to required user hearing (e.g. removing ambient sound channels, adding descriptive text, etc.), and an operational parameter relating to required user cognition (for example providing a quest summary or on-screen navigation guidance, allowing the user to skip puzzles, etc.), as described elsewhere herein;

the method comprises the steps of, for a game to be prospectively played by the user, obtaining a trophy record representing a cohort of other users, obtaining for at least some of the trophies in the trophy record respective classifications indicating one or more accessibility issues, comparing at least some of the classifications to the accessibility profile of the user, and in response to the comparison, providing one or more selected from the list consisting of a recommendation whether or not to play the game, a recommendation whether or not to play a particular game mode, a recommendation to select one or more game settings, and a recommendation to use a particular input method, as described elsewhere herein; and the method comprises the steps of, for each of a plurality of games to be prospectively played by the user, obtaining a trophy record representing a cohort of other users, obtaining for at least some of the trophies in the trophy record respective classifications indicating one or more accessibility issues, comparing at least some of the classifications to the accessibility profile of the user, and in response to the comparisons, ranking the plurality of games according to how well the games meet the accessibility needs of the user as indicated by their accessibility profile, as described elsewhere herein.

It will be appreciated that the above methods may be carried out on conventional hardware (such as entertainment device 10, a central server (not shown), or a combination of the two) suitably adapted as applicable by software instruction or by the inclusion or substitution of dedicated hardware.

Thus the required adaptation to existing parts of a conventional equivalent device may be implemented in the form of a computer program product comprising processor implementable instructions stored on a non-transitory machine-readable medium such as a floppy disk, optical disk, hard disk, solid state disk, ROM, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

Accordingly, in a summary embodiment of the description, a user accessible videogame system (such as entertainment device 10) comprises the following.

Firstly, a records processor (for example CPU 20) adapted (for example by suitable software instruction) to obtain trophy records for a plurality of games played by the user, as described elsewhere herein.

Secondly, a profile processor (for example CPU 20) adapted (for example by suitable software instruction) to generate an accessibility profile responsive to accessibility issues indicated by at least some of the trophy records, as described elsewhere herein.

And thirdly, a parameter processor (for example CPU 20) adapted (for example by suitable software instruction) to modifying one or more operational parameters of the videogame system in response to the generated accessibility profile, as described elsewhere herein.

Instances of this summary embodiment implementing the methods and techniques described herein (for example by use of suitable software instruction) are similarly envisaged to be within the scope of the application.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method comprising:

obtaining a trophy record for one or more games played by a user, the trophy record including a classified trophy that indicates one or more accessibility issues based on a user winning or not winning the classified trophy;

generating an accessibility profile indicating the one or more accessibility issues for the user based on the user winning or not winning the classified trophy; and modifying one or more operational parameters of a videogame system based at least on the generated accessibility profile.

2. The method of claim 1, the trophy record including a second classified trophy that indicates one or more different accessibility issues compared to the classified trophy.

3. The method of claim 1, the trophy record including a second classified trophy that indicates one or more proficiencies of the user.

4. The method of claim 1, wherein generating the accessibility profile indicating the one or more accessibility issues for the user comprises:

generating a profile indicating a first accessibility issue of the one or more accessibility issues based on the user winning the classified trophy.

5. The method of claim 1, wherein generating the accessibility profile indicating the one or more accessibility issues for the user comprises:

generating a profile indicating a first accessibility issue of the one or more accessibility issues based on the user not winning the classified trophy.

6. The method of claim 1, wherein generating the accessibility profile indicating the one or more accessibility issues for the user comprises:

generating a profile indicating the one or more accessibility issues for the user based on the user winning or not winning the classified trophy and an expectation of winning or not winning the classified trophy.

7. The method of claim 1, wherein generating the accessibility profile indicating the one or more accessibility issues for the user comprises:

generating a profile indicating the one or more accessibility issues for the user based on the user winning or not winning the classified trophy and an expectation of winning or not winning trophies at least partially similar to the classified trophy.

8. The method of claim 1, wherein generating the accessibility profile indicating the one or more accessibility issues for the user comprises:

generating a profile indicating the one or more accessibility issues for the user based on the user winning or not winning the classified trophy and how close within a game a success criterion for winning the classified trophy is to the last progress of the user in the game.

9. The method of claim 1, in which the accessibility profile comprises a histogram of classified accessibility issues populated responsive to the trophy record indicating the one or more accessibility issues for the user.

10. The method of claim 1, in which the accessibility profile comprises one or more accessibility categorizations of the user responsive to the one or more accessibility issues indicated by the classified trophy.

11. The method of claim 1, in which at least a first part of the accessibility profile is accessible via an application programming interface, and the step of modifying the one or more operational parameters of the videogame system comprises a videogame modifying one or more selected from the list consisting of:

i. an operational parameter relating to user input;
ii. an operational parameter relating to user dexterity;
iii. an operational parameter relating to user vision;
iv. an operational parameter relating to user hearing; and
V. an operational parameter relating to user cognition.

12. The method of claim 1, comprising the steps of:

for a game to be prospectively played by the user, obtaining a second trophy record representing a cohort of other users;

obtaining for at least some of the trophies in the second trophy record respective classifications indicating one or more accessibility issues;

comparing at least some of the classifications to the accessibility profile of the user; and in response to the comparison, providing one or more selected from the list consisting of:

i. a recommendation whether or not to play the game;
ii. a recommendation whether or not to play a particular game mode;
iii. a recommendation to select one or more game settings; and
iv. a recommendation to use a particular input method.

13. The method of claim 1, comprising the steps of:

for each of a plurality of games to be prospectively played by the user, obtaining a second trophy record representing a cohort of other users;

obtaining for at least some of the trophies in the second trophy record respective classifications indicating one or more accessibility issues;

comparing at least some of the classifications to the accessibility profile of the user; and in response to the comparisons, ranking the plurality of games according to how well the games meet the accessibility needs of the user as indicated by their accessibility profile.

14. A computer program comprising computer executable instructions adapted to cause a computer system to perform a user accessibility method comprising the steps of:

obtaining a trophy record for one or more games played by a user, the trophy record including a classified trophy that indicates one or more accessibility issues based on a user winning or not winning the classified trophy;

generating an accessibility profile indicating the one or more accessibility issues for the user based on the user winning or not winning the classified trophy; and modifying one or more operational parameters of a videogame system based at least on the generated accessibility profile.

15. A user accessible videogame system comprising:

a records processor adapted to obtain a trophy record for one or more games played by a user, the trophy record including a classified trophy that indicates one or more accessibility issues based on a user winning or not winning the classified trophy;

a profile processor adapted to generate an accessibility profile indicating the one or more accessibility issues for the user based on the user winning or not winning the classified trophy; and a parameter processor adapted to modify one or more operational parameters of a videogame system based at least on the generated accessibility profile.

16. The method of claim 1, comprising:

detecting that the user has won or has not won the classified trophy; and in response to detecting that the user has won or has not won the classified trophy, generating the accessibility profile indicating the one or more accessibility issues for the user based on the user winning or not winning the classified trophy.

* * * * *